United States Patent [19]

Moon

[11] Patent Number: 5,343,249
[45] Date of Patent: Aug. 30, 1994

[54] APPARATUS FOR PREVENTING THE SIMULTANEOUS AND OVERLAPPING DISPLAY OF CHARACTERS ON A TELEVISION RECEIVER MONITOR

[75] Inventor: Yang C. Moon, Kungki-do, Rep. of Korea

[73] Assignee: Samsung Electronics Co., Ltd., Kyungki-do, Rep. of Korea

[21] Appl. No.: 933,708

[22] Filed: Aug. 24, 1992

[30] Foreign Application Priority Data

Aug. 23, 1991 [KR] Rep. of Korea ............... 91-14611

[51] Int. Cl.$^5$ .................. H04N 7/08; H04N 5/445
[52] U.S. Cl. .................... 348/564; 348/569; 348/584; 348/468
[58] Field of Search ............ 358/142, 22 PIP, 183, 358/181, 22, 22 C, 147; 348/569, 563, 468, 564, 565, 584; H04N 7/08, 5/445

[56] References Cited

U.S. PATENT DOCUMENTS

| 4,020,501 | 4/1977 | Hillberger et al. | 358/64 |
| 4,633,294 | 12/1986 | Skerlos et al. | 358/22 |
| 4,677,488 | 6/1987 | Zato | 358/181 |
| 4,860,106 | 8/1989 | Taupin et al. | 358/181 |
| 5,128,766 | 7/1992 | Choi | 358/183 |

Primary Examiner—Victor R. Kostak
Assistant Examiner—Nathan J. Flynn
Attorney, Agent, or Firm—Sughrue, Mion, Zinn, Macpeak & Seas

[57] ABSTRACT

An apparatus for preventing the simultaneous display and overlapping of teletext (TTX) characters and on-screen display (OSD) characters on a TV receiver monitor. The apparatus includes switching elements connected between a TTX data generating unit and an OSD data generating unit. The switching elements are controlled by a blanking signal generated by the TTX data generating unit, thereby selectively outputting a TTX signal or an OSD signal and displaying one of them on the TV receiver. Therefore, the TTX signal and the OSD signal are not simultaneously displayed on the TV receiver.

12 Claims, 1 Drawing Sheet

APPARATUS FOR PREVENTING THE SIMULTANEOUS AND OVERLAPPING DISPLAY OF CHARACTERS ON A TELEVISION RECEIVER MONITOR

BACKGROUND OF THE INVENTION

The present invention relates in general to the display of characters on a television receiver and, more particularly, to an apparatus for preventing the simultaneous display and overlapping of teletext characters and on-screen display characters on a television receiver.

In general, conventional TV receivers have a teletext (TTX) processor and/or an on-screen display (OSD) system. A TTX processor displays characters, simple figures, etc. based on an information signal received with the television carrier wave. At the same time, an OSD system displays characters and the like on the TV receiver screen to inform the user of changes in the presently performing functions of the TV, for example, a change of volume or channel.

However, conventional TV receivers having both the TTX processor and OSD system suffer from drawbacks in that TTX characters and OSD characters overlap when displayed so that the viewer cannot recognize either of the displayed characters. That is, if the user changes, for example, the volume of the TV while the TTX processor is displaying characters both TTX characters and OSD characters are mixed making it very difficult, if not impossible, to discern the characters.

Further, such conventional TV receivers have the further disadvantage in that while TTX characters and OSD characters are displayed at the same time, the oscillating frequency of an oscillator driving a TTX data generating unit and the oscillating frequency of an oscillator driving an OSD data generating unit are not synchronized, thereby giving rise to a flicker of the displayed characters.

SUMMARY OF THE INVENTION

Accordingly, it is an object of the present invention to provide an apparatus for preventing the overlapping display of characters on a TV receiver by controlling the switching operation of a TTX processor and an OSD system.

According to a preferred embodiment of the present invention, the above mentioned and other objects are achieved by providing an apparatus for preventing the simultaneous display of teletext (TTX) characters and on-screen display (OSD) characters on a TV receiver monitor, including a TTX data generating circuit for generating and outputting a first color signal and a first binary signal corresponding to TTX information received, the first color signal being representative of the TTX characters, an OSD data generating circuit for generating and outputting a second color signal and a second binary signal corresponding to an OSD message, the second color signal being representative of the OSD characters, a selecting circuit, coupled to the TTX data generating circuit and the OSD data generating circuit, for selectively outputing one of the first and second color signals and first and second binary signals in accordance with the first binary signal, and a matrix circuit for mixing and displaying signals outputted from the selecting circuit on the TV receiver monitor.

The present invention further provides a stabilizing circuit connected between TTX data generating circuit and the OSD data generating unit, for interrupting the output of the OSD data generating unit while displaying the TTX characters on the TV receiver monitor.

BRIEF DESCRIPTION OF THE DRAWING

The object and features of the present invention will become more apparent from the consideration of the following detailed description taken in conjunction with the accompanying drawing in which.

DESCRIPTION OF THE PREFERRED EMBODIMENTS

Figure 1:
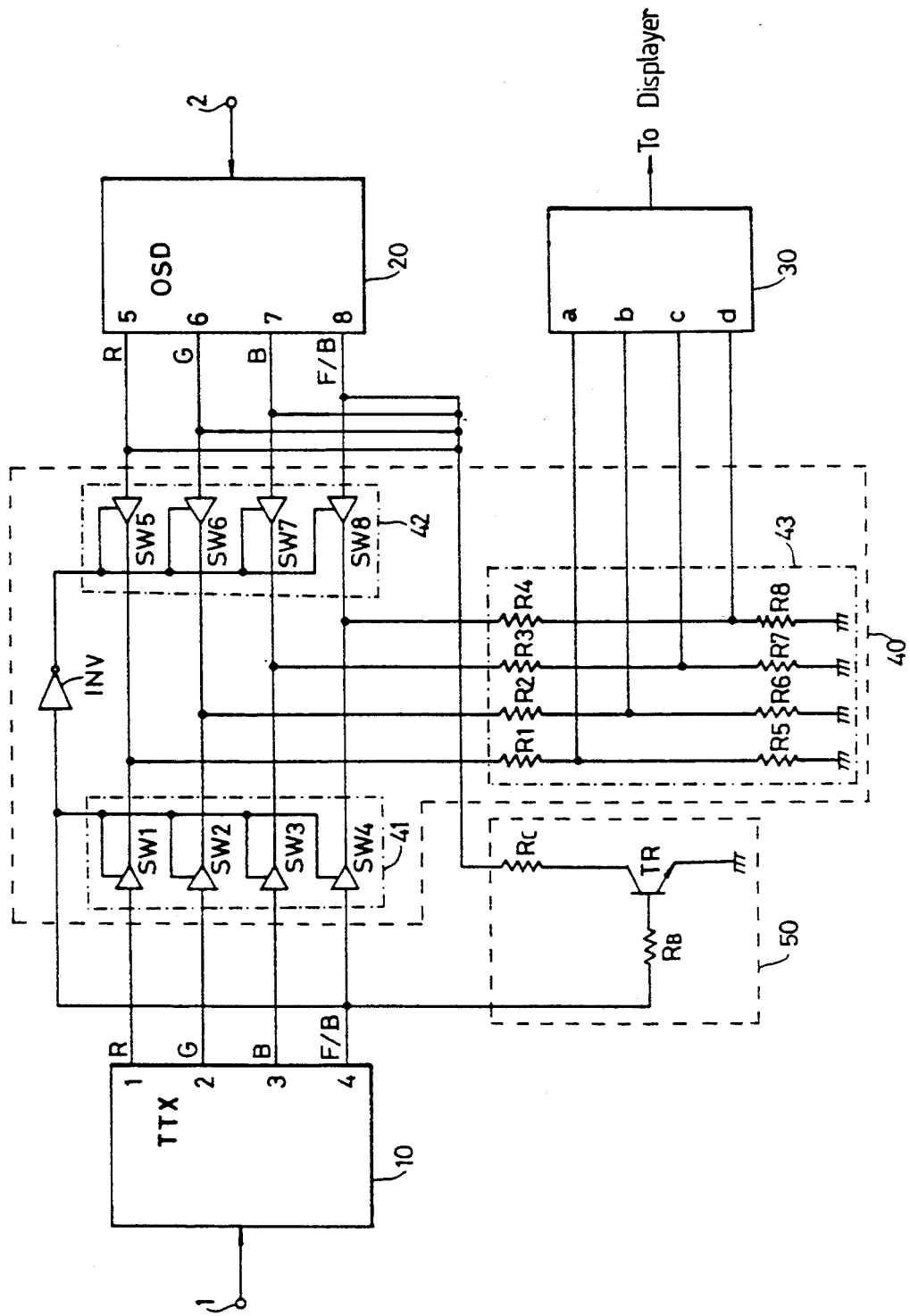
FIG. 1 is a diagram of an apparatus for preventing the overlapping display of characters on a TV receiver according to the present invention.

Referring to FIG. 1, the apparatus, according to the present invention, includes a TTX data generating unit 10, an OSD data generating unit 20, a matrix unit 30, a TTX/OSD selecting unit 40, and a system stabilizing unit 50.

The TTX generating unit 10 includes first, second, and third output terminals 1, 2, and 3 for outputing R, G, and B color signals, respectively, in order to generate a TTX picture signal corresponding to the TTX information received on an input terminal 1. The TTX data generating unit 10 further includes a fourth output terminal 4 for outputing a fast blanking F/B signal so as to remove the TV video signal which would be displayed on the portion of the TV receiver screen corresponding to where the TTX picture signal will be displayed, thus preventing the mixture of the TTX picture signal and the TV video signal.

The OSD data generating unit 20 is for generating a picture signal representing characters and/or simple figures to be displayed on the screen to inform the user of any changes in the presently performing functions of the TV receiver after any function key is activated. The OSD data generating unit includes first, second, and third output terminals 5, 6, and 7 for outputing R, G, and B color signals, respectively, in order to generate an OSD picture signal corresponding to the input OSD message received on an input terminal 2 and a fourth output terminal 8 for outputing a fast blanking (F/B) signal so as to remove the TV video signal which would be displayed on the portion of the TV receiver screen where the OSD picture signal will be displayed.

The TTX/OSD selecting unit 40 includes first and second switching circuits 41 and 42 for respectively switching the output signal of the TTX data generating unit 10 and the OSD data generating unit 20, an inverter INV for inverting the F/B signal outputted by the TTX data generating unit 10, and an impedance matching circuit 43, which is coupled to the common output terminal of both the first and second switching circuits 41 and 42, for adjusting the impedance of the signals provided therefrom. The first switching circuit 41 is switched ON/OFF in accordance with the F/B signal provided from the fourth output terminal 4. On the other hand, the second switching circuit 42 is switched ON/OFF in accordance with the inverted F/B signal (i.e., the output of the inverter INV).

The first switching circuit 41 is composed of a plurality of switching elements SW1 to SW4, each of which is connected to the respective output terminal of the TTX data generating unit 10 and is a buffer type element turning ON/OFF in accordance with the voltage state of the F/B signal provided from the TTX. The second switching circuit 42 is composed of a plurality of switching elements SW5 to SW8, each of which is connected to the respective output terminal of the OSD data generating unit 20 and is a buffer type element turning ON/OFF in accordance with the voltage state of the output signal of the inverter INV. The signals output from the TTX/OSD selecting unit 40 are mixed by the matrix unit 30 and displayed on a monitor (not shown).

The system stabilizing unit 50 includes an NPN transistor TR, whose base terminal is connected to the fourth output terminal 4 of the TTX data generating unit 10 through a base resistance RB and whose collector terminal is connected to the common output terminal of the OSD data generating unit 20. The emitter of the transistor is grounded.

The operation of the above-described apparatus will now be described beginning first when no TTX information is being received.

Since no TTX information is being received through the input terminal 1, no color signals R, G, and B are output through the respective first, second, and third output terminals of the TTX data generating unit 10. Accordingly, the F/B signal through the fourth output terminal is low (L). The F/B signal of the TTX data generating unit 10, which is coupled to the first switching circuit 41 and the inverter INV, causes the switching elements SW1–SW4 of the first switching circuit 41 to be in an OFF state and the inverter to output a high (H) signal. The output signal of the inverter, which is coupled to the switching elements SW5–SW8 of the second switching circuits 42, are switched to an ON state. Therefore, since the voltage signals for driving the first switching circuits 41 and the second switching circuits 42 are opposite (i.e., one is high while the other is low), one of the switching circuits is always ON.

In this case, since the F/B signal of the TTX data generating unit 10 is low, the switching elements SW1 to SW4 of the first switching circuit 41 are OFF and the switching elements SW5 to SW8 of the second switching circuit 42 are ON. Therefore, if the user changes the presently performing functions of the TV by activating any function key, a selecting signal is input to the OSD data generating unit 20 through the input terminal 2 causing the OSD data generating unit 20 to produce an OSD picture signal. That is, characters and/or simple figures, in response to the selecting signal, are generated through the outputting of the color signals R, G, and B through the respective output terminals 5 to 7, and the F/B signal for preventing the mixture of the OSD picture signal with the received TV video signal through the fourth output terminal 8. The output signals of the OSD data generating unit 20 are provided to the impedance matching unit 43 because the switching elements SW5 to SW8 of the second switching circuit 42 are in the ON state. The impedance matching unit 43 adjusts each impedance of the received color signals R, G, and B and the F/B signal according to the corresponding resistances R1 to R8 and then provides the signals to the matrix unit 30. The matrix unit produces a picture signal by mixing the provided color signals R, G, and B and the F/B signal, and outputs the picture signal to a monitor for displaying the OSD picture.

Next, operation of the apparatus will be explained when TTX information is being received.

If the TTX data generating unit 10 is receiving TTX information, the TTX data generating unit 10 produces and outputs at least one of the color signals R, G, and B, along with the F/B signal in a high (H) voltage state.

Therefore, the switching elements SW1 to SW4 of the first switching circuit 41 of the TTX/OSD selecting unit 40 are switched ON, and the switching elements SW5 to SW8 of the second switching circuit 42 are switched OFF.

Accordingly, the first switching circuit 41 provides the output signals R, G, and B and F/B of the TTX data generating unit 10 to the impedance matching unit 43. At this time, although a user may change a presently performing function of the TV, thus causing a selecting signal to be sent to the OSD data generating unit 20, the OSD picture signal from the OSD data generating unit 20 is not supplied to the matrix unit 30 because the switching elements SW5 to SW8 are OFF. Accordingly, the impedance matching unit 43 provides only the TTX picture signal to the matrix unit 30, which produces a picture signal by mixing the provided color signals R, G, and B and F/B signal. The picture signal is then sent to a monitor for displaying a TTX picture.

Therefore, although the user changes the presently performing functions of the TV while receiving TTX information, the TTX signal is displayed rather than the OSD messages or both.

The present invention further includes a system stabilizing unit 50 in order to stabilize the operation of the device. When TTX information is being received by the TTX data generating unit 10, a high voltage signal is output through the fourth output terminal 4 turning the transistor TR of the system stabilizing unit 50 ON. Since the transistor TR is ON, the outputs of the OSD data generating unit 20 are grounded. Therefore, picture signals from both the TTX data generating unit 10 and the OSD data generating unit 20 are not simultaneously displayed and the operation is more stable.

As described above, although a TTX signal and an OSD signal may be generated at the same time, the apparatus of the present invention selectively provides only one of the signals by controlling the TTX/OSD selecting unit 40 to the matrix unit 30, thereby preventing the simultaneous display of the signals.

While the invention has been illustrated and described with the preferred embodiment, it is recognized that variations and changes can be made without departing from the scope and spirit of the invention, which is only defined as set forth in the claim.

I claim:

1. An apparatus for preventing simultaneous display of teletext (TTX) characters and on-screen display (OSD) characters on a TV receiver monitor, comprising:

a TTX data generating circuit for generating and outputting a first color signal and a first binary signal corresponding to TTX information received, said first color signal being representative of the TTX characters;

an OSD data generating circuit for generating and outputting a second color signal and a second binary signal corresponding to an OSD message, said second color signal being representative of the OSD characters;

a selecting circuit, coupled to said TTX data generating circuit and said OSD data generating circuit, for selectively outputting one of said first color signals and binary signal, and said second color signals and binary signal, in accordance with said first binary signal; and a matrix circuit for mixing and outputting said color and binary signals outputted from said selecting circuit for display on the TV receiver monitor.

2. An apparatus according to claim 1, further comprising a stabilizing circuit, responsive to said first and second binary signals, for grounding the output of said OSD data generating circuit while displaying the TTX characters on the TV receiver monitor.

3. An apparatus according to claim 1, wherein said selecting circuit comprises:

a first switching circuit, coupled to outputs of said TTX data generating circuit, outputting said first color signal, said first switching circuit being turned ON and OFF in response to the first binary signal;

an inverter for inverting said first binary signal; and a second switching circuit, coupled to outputs of said OSD data generating circuit, outputting said second color signal, said second switching circuit being turned ON and OFF in response to the inverted first binary signal.

4. An apparatus according to claim 2, wherein said selecting circuit comprises:

a first switching circuit, coupled to outputs of said TTX data generating circuit, outputting said first color signal, said first switching circuit being turned ON and OFF in response to the first binary signal;

an inverter for inverting said first binary signal; and a second switching circuit, coupled to outputs of said OSD data generating circuit, outputting said second color signal, said second switching circuit being turned ON and OFF in response to the inverted first binary signal.

5. An apparatus according to claim 3, wherein said selecting circuit further comprises means, coupled to outputs of said first and second switching circuits, for adjusting an output impedance of said first and said second switching circuits.

6. An apparatus according to claim 4, wherein said selecting circuit further comprises means for adjusting output impedances of said first and second switching circuits.

7. A device according to claim 2, wherein said stabilizing circuit comprises a transistor having a base terminal coupled to said first binary signal, a collector terminal coupled to said second binary signal, and an emitter terminal coupled to ground.

8. An apparatus according to claim 3, wherein said first switching circuit comprises a plurality of buffer elements, having input terminals connected to corresponding output terminals of said TTX data generating unit, an enable input terminal connected to said first binary signal, and an output terminal.

9. An apparatus according to claim 3, wherein said second switching circuit comprises a plurality of buffer elements having input terminals connected to corresponding output terminals of said OSD data generating unit, an enable input terminal connected to the output of said inverter, and an output terminal.

10. An apparatus according to claim 1, wherein said first color signal comprises red, green, and blue color signals corresponding to the TTX characters and said second color signal comprises red, green, and blue color signals corresponding to the OSD characters.

11. An apparatus according to claim 1, further comprising means, responsive to said first binary signal, for preventing the display of TV video signals on the TV receiver monitor where the TTX characters will be displayed.

12. An apparatus according to claim 1, further comprising means, responsive to said second binary signal, for preventing the display of TV video signals on the TV receiver monitor where the OSD characters will be displayed.

* * * * *